(12) United States Patent
Amei

(10) Patent No.: US 9,837,896 B1
(45) Date of Patent: Dec. 5, 2017

(54) DC-TO-DC CONVERTER

(71) Applicant: SMK Corporation, Tokyo (JP)

(72) Inventor: Toshihiro Amei, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 15/414,648

(22) Filed: Jan. 25, 2017

(30) Foreign Application Priority Data

Jun. 7, 2016 (JP) ................................. 2016-113401

(51) Int. Cl.
*H02M 3/156* (2006.01)
*H02M 1/32* (2007.01)
*H02M 3/155* (2006.01)

(52) U.S. Cl.
CPC .............. *H02M 3/156* (2013.01); *H02M 1/32* (2013.01); *H02M 3/155* (2013.01)

(58) Field of Classification Search
CPC .. H02M 3/158; H02M 3/1588; H02M 3/1582; H02M 3/156; H02M 3/155; H02M 3/157; H02M 3/1563; H02M 3/1584; H02M 2001/0012; H02M 2001/0009; H02M 2001/0045; H02M 2001/0067; H02M 2003/1557; H02M 2003/1566; H04B 2215/069; G05F 1/24; G05F 1/56; G05F 1/575

USPC .......................................... 323/271, 280–285
See application file for complete search history.

(56) References Cited

U.S. PATENT DOCUMENTS 7,405,495 B2 * 7/2008 Guillarme ............... H02M 1/32
307/44
2016/0276929 A1   9/2016 Amei

* cited by examiner

*Primary Examiner* — Timothy J Dole
*Assistant Examiner* — Bryan R Perez

(57) ABSTRACT

An object of the present disclosure is to provide a DC-to-DC converter with a simple circuit configuration that continues the supply of direct current power to a load without providing a redundant power supply circuit even if a switching transistor operates abnormally in the active state. A protection circuit unit that converts an input voltage of a direct current input power supply to a different direct current voltage obtained by stepping down the input voltage, as in a direct current voltage conversion circuit unit including a first switching transistor, is connected between the direct current voltage conversion circuit unit and the direct current input power supply and, if the first switching transistor operates in an active state, direct current power of the direct current voltage converted by the protection circuit unit is supplied to a load causing the first switching transistor to maintain operating in the active state.

3 Claims, 3 Drawing Sheets

DC-TO-DC CONVERTER

CROSS REFERENCE TO RELATED APPLICATION

The contents of the following Japanese patent application are incorporated herein by reference, Japanese Patent Application No. 2016-113401 filed on Jun. 7, 2016.

FIELD

The present disclosure relates to a DC-to-DC converter that converts a direct current input voltage to a stable direct current voltage suitable for a load by the opening and closing operation of a switching transistor, and in more detail relates to a DC-to-DC converter with the function of fault tolerance to a failure of a switching transistor.

BACKGROUND

A DC-to-DC converter converts an unstable input voltage of direct current to a stable direct current output voltage to output it to a load. DC-to-DC converters are used as power supplies of various electronic devices that operate on direct current voltage. DC-to-DC converters are separated, based on the operation principle, into an insulation type that increases and reduces the input voltage with a transformer and a non-insulation type that interrupts a current flowing through an inductor with a switching transistor and converts a direct current input voltage to a direct current output voltage of a different voltage level and polarity. The electronic devices in which the input voltage and the output voltage are not greatly different employ non-insulation type DC-to-DC converters that can be configured of relatively simple circuit elements.

A related step-down DC-to-DC converter 100 described in Japanese Patent No. 5811237 is described below with reference to FIG. 3. The DC-to-DC converter 100 includes a direct voltage conversion unit 10 that steps down an input voltage Vi of direct current and outputs it between a high voltage-side output terminal 32a and a low voltage-side output terminal 33a, which are connected to a load RL, and an abnormality determination circuit 4 and a protection circuit 7, which are described below. A direct current input power supply 30 generates the input current Vi of direct current between a high voltage-side power supply terminal 30a and a low voltage-side power supply terminal 30b. As illustrated, a diode D1 of which forward direction is from a low voltage side to a high voltage side and a switching transistor Tr1, the diode D1 and the switching transistor Tr1 being in the direct current voltage conversion unit 10, and a switching transistor Tr2 are connected in series between the high voltage-side power supply terminal 30a and the low voltage-side power supply terminal 30b to form a closed circuit.

A connection point A between the diode D1 and the switching transistor Tr1 is connected via an inductor L1 to a high voltage-side connection line 32, on one side of which is the high voltage-side output terminal 32a. Moreover, the other side of the connection point A of the diode D1 is connected to a low voltage-side connection line 33 wired between the low voltage-side power supply terminal 30b and the low voltage-side output terminal 33a. A capacitor C1 is connected between the high voltage-side connection line 32 and the low voltage-side connection line 33 to supply stable direct current power of an output current Io and an output voltage Vo to the load RL connected between the high voltage-side output terminal 32a and the low voltage-side output terminal 33a.

The switching transistor Tr1 comprises an FET (field-effect transistor). A drive signal output from a constant voltage control circuit 40 to a gate of the switching transistor Tr1 controls the opening and closing of the switching transistor Tr1. Assume that the switching transistor Tr2 serving as the protection circuit 7 is controlled to be normally closed (ON control). While the switching transistor Tr1 is being controlled to be closed (ON control) and is operating in a saturation state, a current flows from the direct current input power supply 30 to the inductor L1 to charge the capacitor C1. However, the charge voltage of the capacitor C1 becoming the output voltage Vo is a voltage lower than the input voltage Vi due to the self-inductance of the inductor L1. Moreover, while the switching transistor Tr1 is being controlled to be open (OFF control) and is operating in an interruption state, electrical energy stored in the inductor L1 becomes a charge current that is fed back through the diode D1 to charge the capacitor C1 and maintain the charge voltage of the capacitor C1 becoming the output voltage Vo.

In terms of the output voltage Vo, its voltage level can be controlled by the closing control time of the switching transistor Tr1 during a unit time. Accordingly, the constant voltage control circuit 40 provides the negative feedback of the duty cycle of the drive signal to perform the control of closing the switching transistor Tr1 from the output voltage Vo, and brings the output voltage Vo to the operating voltage of the load RL through constant voltage control. Hence, the constant voltage control circuit 40 includes a pair of resistive dividers R1 and R2 connected between the high voltage-side connection line 32 and the low voltage-side connection line 33, causes an error amplifier 41 to compare the voltage of a connection point between the resistive dividers R1 and R2 and a reference power supply voltage Vref that is adjusted to a predetermined potential based on the operating voltage of the load RL, and outputs the result to a pulse-width modulation circuit PWM. The pulse-width modulation circuit PWM modulates the pulse width of an oscillation signal with a constant period output from an oscillator OSC with a comparison signal of the error amplifier 41. The pulse-width modulation circuit PWM outputs the signal to a drive circuit 42. The drive circuit 42 outputs, to the gate of the switching transistor Tr1, the drive signal of which duty cycle has been adjusted in accordance with the comparison signal of the error amplifier 41. Consequently, for example, when the output voltage Vo is higher than the operating voltage of the load RL, the drive circuit 42 outputs the drive signal of which duty cycle has been reduced to the gate of the switching transistor Tr1. Accordingly, the ON control time within the unit time is reduced. Therefore, the output voltage Vo reduces. Conversely, when the output voltage Vo is lower than the operating voltage of the load RL, the drive signal of which duty cycle has been increased is output to the gate of the switching transistor Tr1 to extend the ON control time within the unit time. Therefore, the output voltage Vo increases. Accordingly, the output voltage Vo is brought to a predetermined operating voltage that is different according to the load RL through constant voltage control.

On the other hand, when the pulse-width modulation circuit PWM or the like of the constant voltage control circuit 40 fails due to some cause such as a lightening strike, and the drive circuit 42 outputs the drive signal at a constant potential that puts the switching transistor Tr1 in an active state to the gate (base) of the switching transistor Tr1, the DC-to-DC converter 100 puts the switching transistor Tr1 in a normally closed state (ON state) to operate as a series regulator (dropper circuit) that consumes the input power by the on-resistance of the switching transistor Tr1 and outputs the output voltage lower than the input voltage.

However, unlike a power MOS and a power transistor, which take measures against heat dissipation, a DC-to-DC converter that reduces the switching loss at the switching transistor Tr1 as much as possible and converts the input voltage to a direct current output voltage highly efficiently uses the switching transistor Tr1 that cannot dissipate thermal energy generated by the on-resistance, which becomes a cause of the occurrence of a serious accident where heat is generated to cause a fire. In addition, even if the switching transistor Tr1 operates in the active state, the output voltage and the output current do not fluctuate largely from the set values. Accordingly, the risk of a fire is increased while the abnormality of the switching transistor Tr1 operating in the active state cannot be found from the outside.

Hence, in the DC-to-DC converter 100 described in Japanese Patent No. 5811237, the focus is concentrated on the point that when the switching transistor Tr1 operates abnormally in the active state, the switching transistor Tr1 does not perform the opening and closing operation in a predetermined cycle and a voltage Vd of the connection point A on the side, which is connected to the inductor L1, of the switching transistor Tr1 does not change. When the voltage Vd of the connection point A does not change during a detection period longer than the predetermined cycle, the abnormality determination circuit 4 connected to the connection point A determines that the switching transistor Tr1 is operating in the active state.

Moreover, the switching transistor Tr2 serving as the protection circuit 7 is connected between the high voltage-side power supply terminal 30a and the switching transistor Tr1. The abnormality determination circuit 4 is connected to a gate of the switching transistor Tr2. The switching transistor Tr2 is controlled to be normally closed (ON control) by the drive signal output from the abnormality determination circuit 4. When the abnormality determination circuit 4 has determined that the switching transistor Tr1 is operating in the active state, the switching transistor Tr2 is controlled to be open (OFF control). The supply of current to the switching transistor Tr1 from the direct current input power supply 30 is stopped. Consequently, it is possible to prevent abnormal heat generation in the switching transistor Tr1.

According to the above-mentioned related DC-to-DC converter 100, when the switching transistor Tr1 operates in the active state, the supply of current to the switching transistor Tr1 is stopped, and fail-safe that stops the operation of the direct current voltage conversion unit 10 works. Accordingly, a fire accident due to heat generation in the switching transistor Tr1 can be prevented from occurring. However, fault tolerance is not considered. Therefore, when the abnormal operation of the switching transistor Tr1 is detected, the supply of direct current power to the load RL is also stopped. If the DC-to-DC converter 100 is used in systems for, for example, the flight of an airplane, the travel of an automobile, and the lift of an elevator, direct current power is not supplied to these systems to become a cause of provoking a severer accident with the risk of death.

Hence, when the function of fault tolerance is added to the DC-to-DC converter 100, a redundant power supply circuit having the same configuration as that of the above-mentioned direct current voltage conversion unit 10 is normally placed in parallel between the high voltage-side output terminal 32a connected to the direct current input power supply 30 and the load RL, and the low voltage-side power supply terminal 30b. When an abnormal operation of the switching transistor Tr1 of the direct current voltage conversion unit 10, which is caused to operate normally, is detected, the redundant power supply circuit is activated to operate.

However, if the redundant power supply circuit having the same configuration is placed in parallel in this manner, the entire circuit configuration of the DC-to-DC converter 100 becomes complicated and is increased in size. Furthermore, the direct current voltage conversion unit 10 where the switching transistor Tr1 is operating abnormally continues its operation in parallel in the face of heat generation. Accordingly, it is necessary to provide means for stopping the operation of the failed direct current voltage conversion unit 10. In addition, it is necessary to provide switching means for switching operation to the redundant power supply circuit. Especially, in terms of the switching of operation to the redundant power supply circuit, the direct current power of a stable output voltage cannot be supplied immediately after the redundant power supply circuit is activated; accordingly, it is difficult to perform the switching control of switching operation to the redundant power supply circuit without stopping the supply of the direct current power to the load RL.

The present disclosure has been made considering such related problems. An objective thereof is to provide a DC-to-DC converter with a simple circuit configuration that continues the supply of direct current power to a load RL without providing a redundant power supply circuit even if a switching transistor Tr1 operates abnormally in the active state.

Moreover, another objective is to provide a DC-to-DC converter that has no risk of heat generation even if the switching transistor Tr1 of a direct current voltage conversion unit is caused to operate continuously in the active state.

SUMMARY

In order to achieve the above-mentioned objectives, a DC-to-DC converter according to a first aspect includes: a direct current voltage conversion circuit unit including a first switching transistor connected in series to a direct current input power supply to form a closed circuit with the direct current input power supply, a first drive circuit configured to output a first drive signal to control the opening and closing of the first switching transistor in a predetermined cycle to a control terminal of the first switching transistor, a first capacitor connected between a pair of a high voltage-side connection line and a low voltage-side connection line, the pair being connected to a load, a first inductor configured to convert an output voltage between the pair of the high voltage-side connection line and the low voltage-side connection line to a direct current voltage different from an input voltage of the direct current input power supply with the interruption of a current flowing from the direct current input power supply by the opening and closing operation of the first switching transistor, and a first constant voltage control circuit configured to control a closed time of the first switching transistor with the first drive signal in accordance with the output voltage between the pair of the high voltage-side connection line and the low voltage-side connection line, and perform constant voltage control on the output voltage; an abnormality determination circuit including a first comparison circuit to compare a voltage Vd of a connection point A on a side, which is connected to the first inductor, of the first switching transistor and a threshold voltage Vth freely set within the range of fluctuation of the voltage Vd of the connection point A during the switching operation of the first switching transistor, the abnormality determination circuit being configured to determine that the first switching transistor is operating in an active state upon polarity found by the comparison of the voltage Vd and the threshold voltage Vth does not change during a detection period longer than the predetermined cycle of the drive signal; and a protection circuit unit connected between the direct current input power supply and the direct current voltage conversion circuit unit to shift to protection operation mode at the time when the abnormality determination circuit determines that the first switching transistor is operating in the active state and to execute an operation of protecting the direct current voltage conversion circuit unit. The protection circuit unit includes a second switching transistor connected between the direct current input power supply and the first switching transistor, a second drive circuit configured to normally output a second drive signal to perform control of closing the second switching transistor to a control terminal of the second switching transistor, and output the second drive signal to perform control of opening and closing the second switching transistor in a predetermined cycle in protection operation mode, a second capacitor connected between the pair of the high voltage-side connection line and the low voltage-side connection line on an input side of the direct current voltage conversion circuit unit, a second inductor configured to in protection operation mode convert a voltage across the second capacitor to a direct current voltage obtained by stepping down the input voltage of the direct current input power supply with the interruption of the current flowing from the direct current input power supply by the opening and closing operation of the second switching transistor, and a second constant voltage control circuit configured to in protection operation mode control a closed time of the second switching transistor with the second drive signal in accordance with the voltage across the second capacitor and perform constant voltage control on the voltage across the second capacitor.

The voltage Vd of the connection point A on the side, which is connected to the first inductor, of the first switching transistor fluctuates within the range of fluctuation during the normal switching operation, in which a saturation state and an interruption state is repeated, of the first switching transistor. The polarity found by the first comparison circuit of the abnormality determination circuit comparing the voltage Vd and the threshold voltage Vth changes within the predetermined cycle when the first switching transistor is opened and closed. When the first switching transistor operates in the active state, an input voltage Vi is substantially constant, and the voltage Vd of the connection point A also maintains substantially the same potential. Accordingly, the polarity found by the first comparison circuit comparing the voltage Vd and the threshold voltage Vth does not change even during the detection period longer than the predetermined cycle when the first switching transistor is opened and closed. Therefore, the abnormality determination circuit determines that the first switching transistor is operating in the active state, and the protection circuit unit shifts to protection operation mode.

In protection operation mode, the second switching transistor performs the opening and closing operation in a predetermined cycle to allow the second inductor to convert the voltage across the second capacitor to the direct current voltage obtained by stepping down the input voltage of the direct current input power supply. The second constant voltage control circuit brings the voltage across the second capacitor to the stable voltage obtained by stepping down the input voltage of the direct current input power supply through constant voltage control. Accordingly, the output voltage between the pair of the high voltage-side connection line and the low voltage-side connection line is supplied at the stable voltage obtained by stepping down the input voltage to the load via the first switching transistor that is operating in the active state.

A voltage on the high voltage side of the first switching transistor that is operating in the active state is substantially equal to the voltage across the second capacitor obtained by stepping down the input voltage of the direct current input power supply. Accordingly, the value of the voltage applied to the first switching transistor is reduced since the protection circuit unit shifts to protection operation mode. Even if the first switching transistor operates in the active state, there is no risk of abnormal heat generation.

In the DC-to-DC converter according to a second aspect, the second constant voltage control circuit brings the voltage across the second capacitor to a voltage slightly higher than the output voltage between the pair of the high voltage-side connection line and the low voltage-side connection line, the pair being connected to the load, through constant voltage control so that the amount of heat generation of the first switching transistor due to a voltage across the first switching transistor does not exceed a maximum heat dissipation amount of the first switching transistor.

A voltage drop Vtr across the first switching transistor that is operating in the active state is a potential difference between the output voltage between the pair of the high voltage-side connection line and the low voltage-side connection line, the pair being connected to the load, and the voltage across the second capacitor. The amount of heat generation of the first switching transistor that is operating in the active state is proportional to the square of Vtr. Constant voltage control is performed on the voltage across the second capacitor for the output voltage between the pair of the high voltage-side connection line and the low voltage-side connection line, the pair being connected to the load. Accordingly, the amount of heat generation of the first switching transistor can be controlled to be equal to or less than the maximum heat dissipation amount of the first switching transistor.

The DC-to-DC converter according to a third aspect further includes a reporting unit configured to, upon the abnormality determination circuit determining that the first switching transistor is operating in the active state, report the determination result to the outside.

The reporting unit reports, to the outside, the abnormal operation of the first switching transistor that does not appear on the outside.

The first aspect in accordance with the present disclosure can continuously supply, to the load, the direct current power of the output voltage obtained by stepping down the input voltage without stopping the operation of the failed direct current voltage conversion circuit unit without providing another redundant power supply circuit corresponding to the direct current voltage conversion circuit unit in parallel even if the switching transistor of the direct current voltage conversion circuit unit operates abnormally.

Moreover, even if the switching transistor of the direct current voltage conversion circuit unit is caused to operate remaining in the active state, there is no risk of abnormal heat generation in the switching transistor.

The second aspect in accordance with the present disclosure can securely prevent the occurrence of a fire without generating heat abnormally even if the first switching transistor is caused to operate remaining in the active state.

In the third aspect in accordance with the present disclosure, the reporting unit reports, to the outside, the abnormal operation of the first switching transistor that does not appear on the outside. Accordingly, it is possible to take measures for recovery such as the repair or replacement of the failed part of the direct current voltage conversion circuit unit after the risk of heat generation of the switching transistor is conveyed to a user and the operation of the DC-to-DC converter is stopped safely.

DESCRIPTION OF EMBODIMENTS

Figure 1:
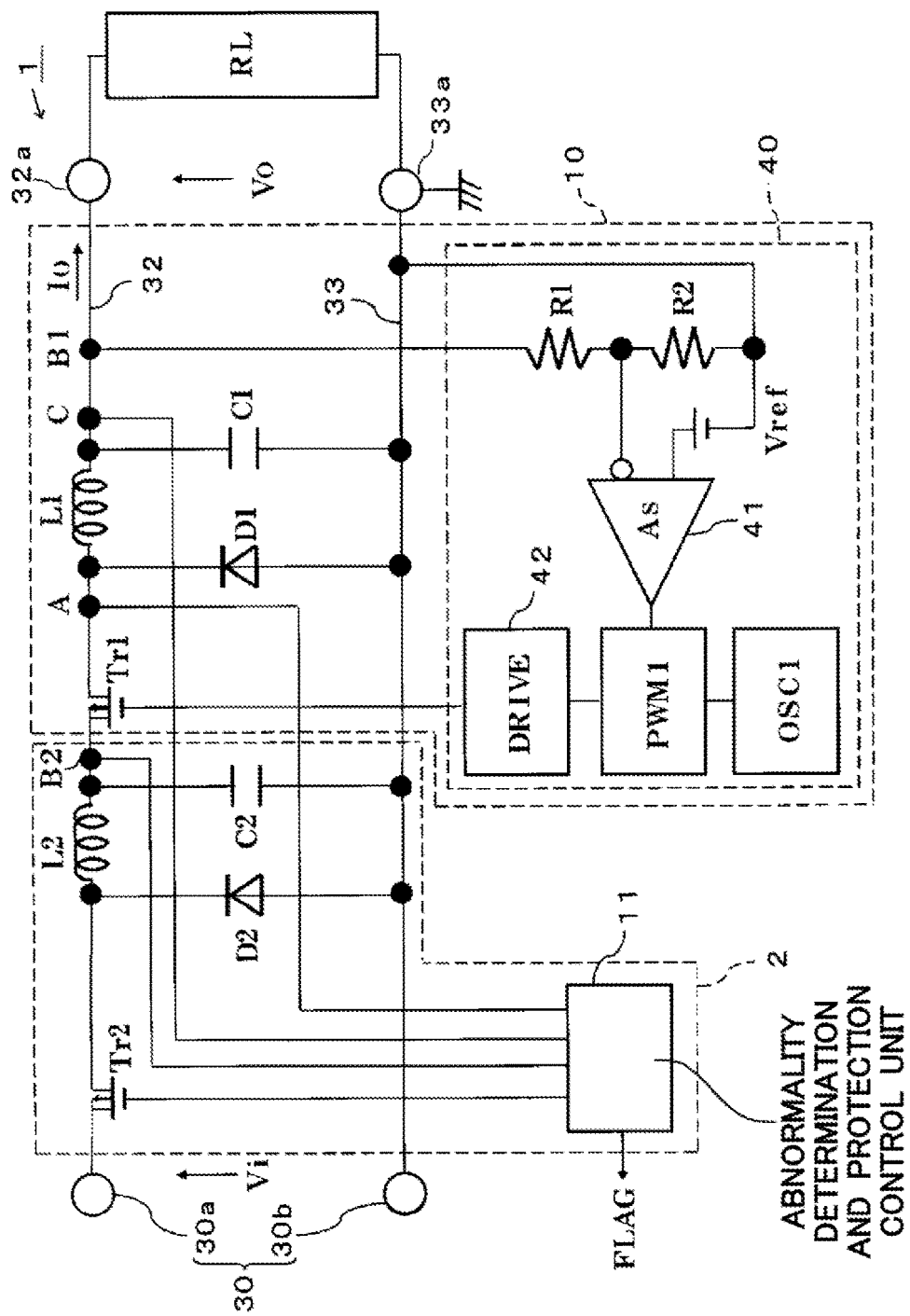
FIG. 1 is a circuit diagram of a step-down DC-to-DC converter 1 according to one embodiment of the invention of the present application.

A DC-to-DC converter 1 according to one embodiment of the present invention is a step-down DC-to-DC converter 1 that converts a direct current input voltage Vi of 12 V to a direct current output voltage Vo of 5V. The step-down DC-to-DC converter 1 is described hereinafter with reference to FIGS. 1 and 2. FIG. 1 is a circuit diagram of the step-down DC-to-DC converter 1 to which a protection circuit 2 is added without changing the basic configuration of a related DC-to-DC converter 100 illustrated in FIG. 3 as is clear from a comparison with the DC-to-DC converter 100. Therefore, the main circuit configuration is common to that of the above-mentioned related step-down DC-to-DC converter 100. Accordingly, the same numerals are assigned to configurations that act substantially in the same manner or similarly, and their detailed descriptions are omitted.

A direct current input power supply 30 is an unstable power supply where the direct current input voltage Vi fluctuates in voltage by approximately 10%. A switching transistor Tr2 forming a part of the protection circuit 2, and a switching transistor Tr1 and a diode D1 of which forward direction is from a low voltage side to a high voltage side, the switching transistor Tr1 and the diode D1 forming a part of a direct current voltage conversion unit 10, are connected in series between a high voltage-side power supply terminal 30a of +12 V and a low voltage-side power supply terminal 30b of 0 V to form a closed circuit.

The switching transistors Tr1 and Tr2 are both P-channel FETs (field-effect transistors). The switching transistor Tr1 is connected at its gate to a drive circuit 42 of a constant voltage control circuit 40 including a control IC. The switching transistor Tr1 is ON/OFF controlled by a drive signal output from the drive circuit 42. Moreover, the switching transistor Tr2 is connected at its gate to an output of a drive circuit 21, which is described below, of the protection circuit 2. The switching transistor Tr2 is normally ON-controlled by a drive signal output from the drive circuit 21. The switching transistor Tr2 is ON/OFF controlled by the drive signal when the operation of the switching transistor Tr1 in an active state is detected. The ON control of the switching transistors Tr1, Tr2 indicates performing the closing control between the drain and the source with the switching transistors Tr1, Tr2 in a saturation state. The OFF control indicates the opening control between the drain and the source as an interruption state.

The drive signal output from the drive circuit 42 is, for example, a pulse signal that repeats the ON time of 0 V and the OFF time of +12 V in a fixed period T of 1 µsec. In a normal state where while the drive circuit 42 is outputting a drive signal of +0 V to the gate of the switching transistor Tr1, the switching transistor Tr1 is ON-controlled and the switching transistor Tr2 is ON-controlled, charge current that charges a capacitor C1 normally flows from the direct current input power supply 30 to an inductor L1. The charge voltage of the capacitor C1 becoming the output voltage Vo during the ON control time is a voltage of +5 V lower than the input voltage Vi of +12 V due to the self-inductance of the inductor L1.

Moreover, when the drive circuit 42 outputs a drive signal of +12 V to the gate of the switching transistor Tr1, the switching transistor Tr1 is OFF-controlled. During the OFF control time, the electrical energy stored in the inductor L1 becomes the charge current that is fed back through the diode D1 to charge the capacitor C1 with the same polarity as that of the charge voltage. The output voltage Vo reduced by the power consumption of a load RL (the charge voltage of the capacitor C1) is maintained at +5V.

The constant voltage control circuit 40 brings the output voltage Vo to the operating voltage of the load RL through constant voltage control. The constant voltage control circuit 40 includes a pair of resistive dividers R1 and R2 connected between a connection point B1 of a high voltage-side connection line 32 connected to the load RL and a low voltage-side connection line 33, an error amplifier 41 that compares the voltage of a connection point between the resistive dividers R1 and R2 and a reference power supply voltage Vref that is adjusted to a predetermined potential based on the operating voltage of the load RL, a pulse-width modulation circuit PWM1 that modulates the pulse width of a signal of a triangle wave, a sawtooth wave, or the like of a fixed frequency of 1 MHz output from an oscillator OSC1 with the output of the error amplifier 41, and the drive circuit 42 that outputs the modulated signal output from the pulse-width modulation circuit PWM1 as the drive signal to the gate of the switching transistor Tr1.

When the output voltage Vo is higher than the operating voltage of the load RL, the pulse-width modulation circuit PWM1 controls the pulse signal to reduce the ON time within the fixed period T of 1 µsec to output the drive signal of which duty cycle has been reduced to the gate of the switching transistor Tr1. As a result, the ON control time of the switching transistor Tr1 within the unit time is reduced to reduce the output voltage Vo. Conversely, when the output voltage Vo is lower than the operating voltage of the load RL, the drive signal of which duty cycle has been increased is output to the gate of the switching transistor Tr1 to extend the ON control time within the unit time. Accordingly, the output voltage Vo increases. The output voltage Vo is brought to a predetermined operating voltage different according to the load RL through constant voltage control.

In the step-down DC-to-DC converter 1 where the constant voltage control circuit 40 that operates normally brings the output voltage Vo to 5 V, which is the operating voltage of the load RL, through constant voltage control, for example, a drive signal of which duty cycle is 44% is output to the gate of the switching transistor Tr1 to control the switching of the switching transistor Tr1, and the direct current input voltage Vi of 12 V is converted to the output voltage Vo of 5 V. The potential of a connection point A between the switching transistor Tr1 and the inductor L1 while the switching transistor Tr1 is performing the switching operation normally is +12 V equal to the potential of the high voltage-side power supply terminal 30a while the switching transistor Tr1 is being ON-controlled, and is −0.5 V that is reduced by a voltage drop Vf across the diode D1 of approximately 0.5 V from the ground potential of the low voltage-side power supply terminal 30b while the switching transistor Tr1 is being OFF-controlled. Accordingly, the potential of the connection point A fluctuates between −0.5 V and +12 V.

Figure 2:
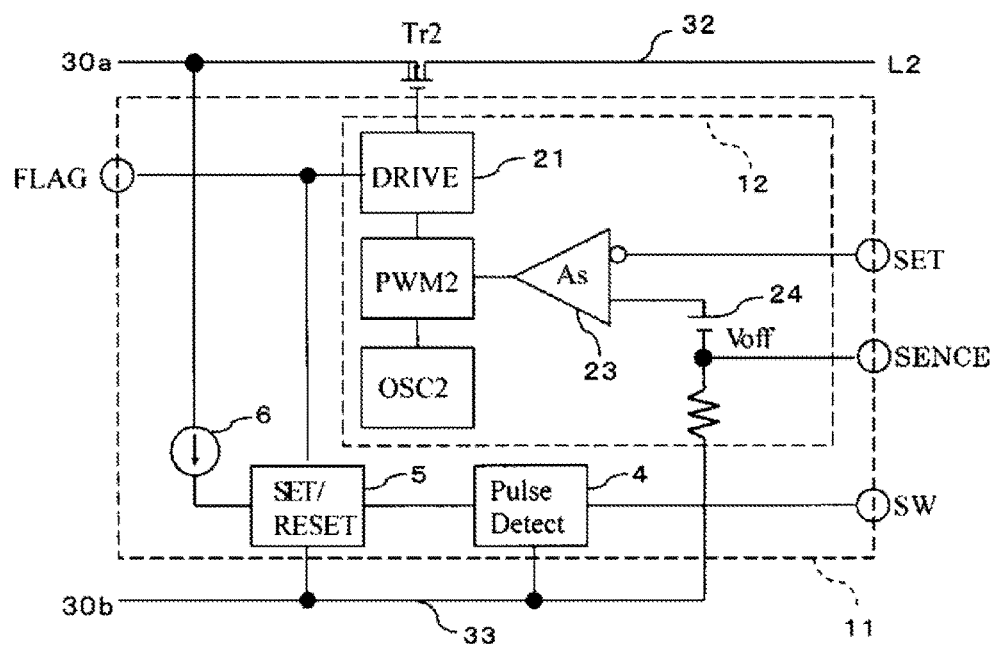
FIG. 2 is a block diagram of an abnormality determination and protection control unit 11.
Figure 3:
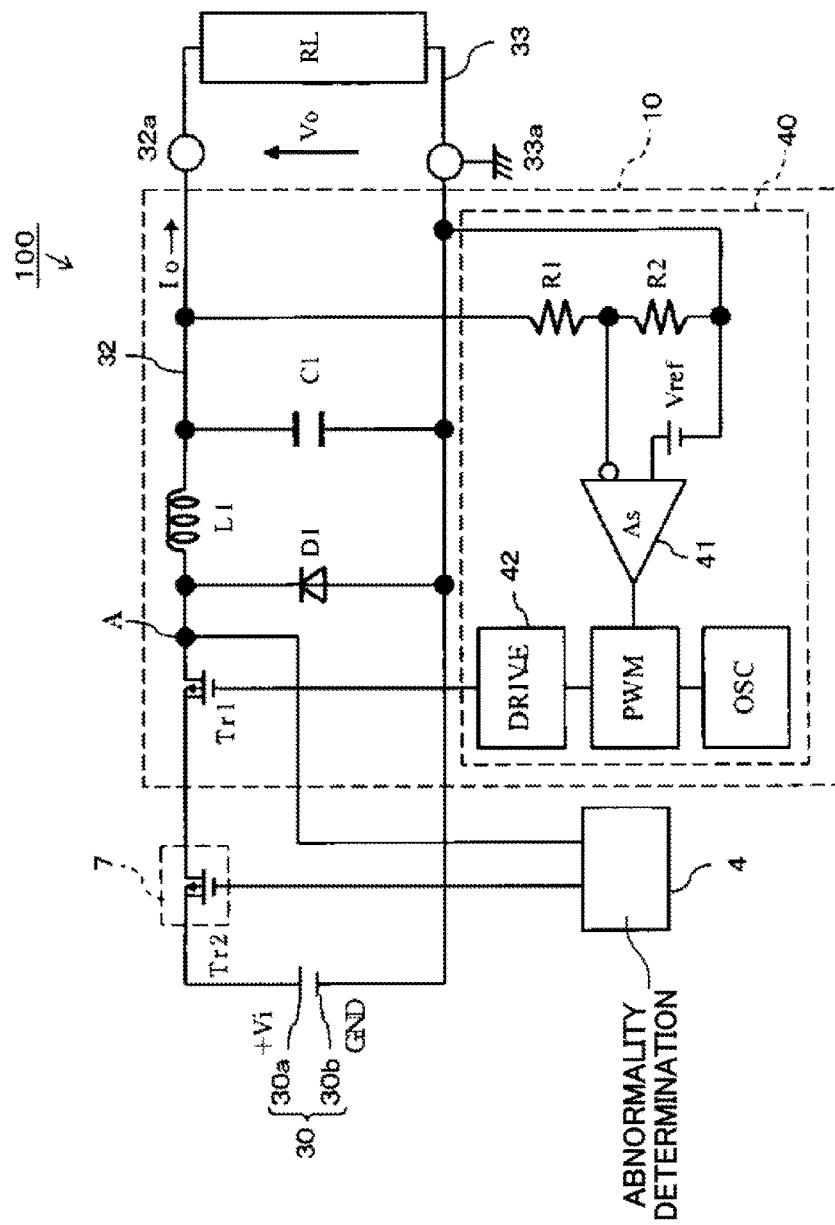
FIG. 3 is a circuit diagram of a related DC-to-DC converter 100.

As illustrated in FIG. 2, an abnormality determination and protection control unit 11 includes an abnormality determination circuit 4 where a detection terminal SW is connected to the connection point A between the switching transistor Tr1 and the inductor L1 to monitor the potential of the connection point A, and an RS flip-flop circuit 5 connected to an output of the abnormality determination circuit 4. The abnormality determination circuit 4 and the RS flip-flop circuit 5 are connected between a constant current circuit 6 connected to the high voltage-side power supply terminal 30a and the low voltage-side power supply terminal 30b, and operate using, as a power supply, the direct current input power supply 30 where the constant current circuit 6 performs a conversion to a stable potential.

The abnormality determination circuit 4 includes an unillustrated comparison circuit that compares a voltage Vd of the connection point A and a threshold voltage Vth that is freely set within the range of fluctuation of the voltage Vd while the switching transistor Tr1 is performing the switching operation. In the embodiment, the voltage Vd of the connection point A fluctuates between 0.5 V and +5 V. Accordingly, the threshold voltage Vth is set to +0.5 V between them.

While the switching transistor Tr1 is performing the switching operation normally, the polarity of the output of the comparison circuit is reversed within at least the fixed period T of 1 μsec. On the other hand, if the pulse-width modulation circuit PWM1 or the like fails due to some cause and the drive signal output to the gate of the switching transistor Tr1 has a constant potential, the switching transistor Tr1 operates in the active state, and the direct current input voltage Vi is at a substantially constant potential. Accordingly, the voltage Vd of the connection point A also has a constant potential. The polarity of the output of the comparison circuit is not reversed within the fixed period T. Hence, when the polarity of the output of the comparison circuit is not reversed even once during the detection period set to 2 μsec longer than the fixed period T of the drive circuit 42, the abnormality determination circuit 4 determines that it is the abnormal operation in the active state. The abnormality determination circuit 4 normally changes the output from "L" level to at "H" level and outputs it to a Set input of the RS flip-flop circuit 5.

The RS flip-flop circuit 5 outputs an output signal at "L" level until the set signal at "H" level is input from the abnormality determination circuit 4 after a reset signal at "L" level is input. On the other hand, if the Set signal at "H" level that has been determined that the switching transistor Tr1 was operating in the active state is input from the abnormality determination circuit 4, the RS flip-flop circuit 5 outputs the output signal at "H" level until the next time the reset signal at "L" level is input.

An output of the RS flip-flop circuit 5 is connected to an output terminal FLAG connected to the drive circuit 21 and an unillustrated warning display device. While the output signal at "L" level that has been determined that the switching transistor Tr1 was operating normally is being output, the protection circuit 2 operates in normal operation mode, and the drive circuit 21 continuously outputs the drive signal of +0 V for ON-controlling the switching transistor Tr2 to the gate of the switching transistor Tr2. On the other hand, while the output signal at "H" level that has been determined that the switching transistor Tr1 was operating in the active state is being output from the RS flip-flop circuit 5, the protection circuit 2 operates in protection operation mode, and the drive circuit 21 outputs the drive signal for ON/OFF-controlling the switching transistor Tr2 to the gate of the switching transistor Tr2 based on a modulated signal output from a pulse-width modulation circuit PWM2 described below. Moreover, the warning display device, into which the output signal at "H" level has been input from the output terminal FLAG, displays information that the switching transistor Tr1 is operating abnormally.

As illustrated in FIG. 1, the protection circuit 2 is formed on the direct current input power supply 30 side being the input side of the direct current voltage conversion unit 10, and includes circuit elements that operate as in the circuit elements of the direct current voltage conversion unit 10. In other words, the switching transistor Tr2 and a diode D2 of which forward direction is from the low voltage side to the high voltage side are connected in series for the high voltage-side power supply terminal 30a and the low voltage-side power supply terminal 30b to form a closed circuit between the high voltage-side power supply terminal 30a and the low voltage-side power supply terminal 30b on the direct current input power supply 30 side of the closed circuit including the switching transistor Tr1 and the diode D1.

Moreover, an inductor L2 is connected between a connection point between the switching transistor Tr2 and the diode D2 and the input side (source) of the switching transistor Tr1. A capacitor C2 to cause the input side of the switching transistor Tr1 to have a stable direct current voltage while the protection circuit 2 is operating in protection operation mode is connected between a connection point B2 of the inductor L2 and the switching transistor Tr1, and the low voltage-side connection line 33.

While the protection circuit 2 is operating in normal operation mode, the switching transistor Tr2 is normally ON-controlled, and when voltage drops across the switching transistor Tr2 and the inductor L2, through which the direct current flows, are ignored, the input voltage Vi of direct current is applied to the switching transistor Tr1, and the direct current voltage conversion unit 10 steps down the input voltage Vi to supply the direct current power of the constant voltage controlled output voltage Vo to the load RL.

After the protection circuit 2 shifts to protection operation mode, the switching transistor Tr2 is being ON/OFF-controlled by the drive signal output from the drive circuit 21. While the switching transistor Tr2 is ON-controlled, a current flows from the direct current input power supply 30 to the inductor L2 to charge the capacitor C2. However, the charge voltage of the capacitor C2 becoming a direct current voltage on the high voltage side of the switching transistor Tr1 is a voltage obtained by reducing the input voltage Vi by the self-inductance of the inductor L2. Moreover, while the switching transistor Tr2 is being OFF-controlled, and is operating in the interruption state, the electrical energy stored in the inductor L2 becomes a charge current that is fed back through the diode D2 to charge the capacitor C2 and maintain the charge voltage of the capacitor C2 being the direct current voltage on the high voltage side of the switching transistor Tr1.

The amount of heat generation of the switching transistor Tr1 while the switching transistor Tr1 is operating in the active state is expressed as $(Vtr)^2/r$ where r is the on resistance and Vtr is a differential voltage between the voltage of the source on the connection point B2 side (the charge voltage of the capacitor C2) and the voltage of the drain on the connection point A side (the output voltage Vo). As described above, when the protection circuit 2 shifts to protection operation mode, the voltage of the source on the connection point B2 side of the switching transistor Tr1 is reduced to a voltage sufficiently lower than the input voltage Vi. The differential voltage Vtr from the output voltage Vo of the drain on the connection point A side is reduced. Accordingly, the amount of heat generation is dramatically reduced so that the risk of abnormal heat generation disappears.

However, in the embodiment, the protection circuit 2 further includes a constant voltage control circuit 12 that brings the voltage across the switching transistor Tr1 to the differential voltage Vtr through constant voltage control so that the amount of heat generation of the switching transistor Tr1 does not exceed a maximum heat dissipation amount Qmax, that is, $(Vtr)^2/r<Qmax$. The constant voltage control circuit 12 is integrated in the abnormality determination and protection control unit 11 as illustrated in FIG. 2.

The constant voltage control circuit 12 includes an offset power supply 24 that outputs a direct current offset voltage corresponding to a target differential voltage Vtrset on which constant voltage control is performed, an error amplifier 23 connected at its inverting input terminal to a SET terminal and connected at its non-inverting input terminal to a SENCE terminal via the offset power supply 24, the pulse-width modulation circuit PWM2 that modulates the pulse width of a signal of a triangular wave, a sawtooth wave, or the like of a fixed frequency of 1 MHz output from an oscillator OSC2 with the output of the error amplifier 23, and the drive circuit 21 that outputs the modulated signal output from the pulse-width modulation circuit PWM2 as the drive signal to the gate of the switching transistor Tr2, in protection operation mode of the protection circuit 2.

The SET terminal connected to the inverting input terminal of the error amplifier 23 is connected to the connection point B2 between the inductor L2 and the switching transistor Tr1 on the high voltage-side connection line 32. The SENCE terminal connected to the non-inverting input terminal via the offset power supply 24 is connected to a connection point C of the high voltage-side connection line 32 connected to the load RL. Consequently, the error amplifier 23 compares a voltage to which a direct current offset voltage Voff is added to the output voltage Vo and the voltage on the high voltage-side of the switching transistor Tr1. While the protection circuit 2 is operating in protection operation mode, the output current of direct current flows through the inductor L1. The error amplifier 23 compares the differential voltage Vtr between the high voltage side and the low voltage side of the switching transistor Tr1 and the target differential voltage Vtrset specified by the direct current offset voltage Voff when a voltage drop across the inductor L1 is ignored.

When the differential voltage Vtr is higher than the target differential voltage Vtrset, the pulse-width modulation circuit PWM2 controls the pulse signal to reduce the ON time within the fixed period T. The drive signal of which duty cycle has been reduced is output to the gate of the switching transistor Tr2. As a result, the ON control time within the unit time of the switching transistor Tr2 reduces; accordingly, the charge voltage of the capacitor C2, that is, the voltage on the high voltage side of the switching transistor Tr1 reduces. The differential voltage Vtr reduces to approach the target differential voltage Vtrset. Conversely, when the differential voltage Vtr is lower than the target differential voltage Vtrset, the drive signal of which duty cycle has been increased is output to the gate of the switching transistor Tr2 to extend the ON control time within the unit time. Accordingly, the charge voltage of the capacitor C2 increases. The differential voltage Vtr increases to approach the target differential voltage Vtrset. The above operation is repeated to bring the voltage across the switching transistor Tr1 to the target differential voltage Vtrset through constant voltage control.

In the embodiment, the direct current input voltage Vi is set to 12 V, the output voltage Vo on which constant voltage controls is performed to 5 V during normal operation. Accordingly, the offset power supply 24 that sets the target differential voltage Vtrset to 1 V and outputs a direct current voltage of 1 V is used.

Consequently, even if the switching transistor Tr1 continues operating in the active state, the voltage across the switching transistor Tr1 with the on resistance r is brought to 1 V through constant voltage control. The switching transistor Tr1 does not generate heat abnormally irrespective of the voltages of the direct current input voltage Vi and the output voltage Vo.

The operation of the switching transistor Tr1 in the active state and the operation of the protection circuit 2 in protection operation mode are conveyed to a user by display on the warning display device as described above. Accordingly, a failed part can be repaired and recovered after the operation of the DC-to-DC converter 1 becomes possible to be stopped safely.

If while the protection circuit 2 is operating in protection operation mode, the cause of a failure to put the switching transistor Tr1 in the active state is somehow solved and the switching transistor Tr1 resumes the switching operation, the abnormality determination circuit 4 determines that it is the normal operation and then outputs a reset signal at "L" level to the RS flip-flop circuit 5. Accordingly, the protection circuit 2 returns to normal operation mode in which the switching transistor Tr2 is normally ON-controlled to return the direct current voltage conversion unit 10 to normal operation.

In the above-mentioned embodiment, a P-channel FET or an N-channel FET is used as the switching transistors Tr1, Tr2. However, the switching transistors Tr1, Tr2 may be an N-channel FET or a P-channel FET in which the drain and the source are connected the other way around, or may be a bipolar transistor.

Moreover, the constant voltage control circuit 12 that operates when the protection circuit 2 operates in protection operation mode performs constant voltage control on the differential voltage Vtr of the switching transistor Tr1. However, constant voltage control may be performed on the charge voltage of the capacitor C2 and on the voltage on the high voltage side of the switching transistor Tr1.

Moreover, in the above-mentioned embodiment, the example is described in which when the abnormality determination circuit 4 determines that the switching transistor Tr1 is operating in the active state, the warning display device displays and reports the abnormal operation of the switching transistor Tr1. However, another method such as the issuance of sound such as a warning sound may make the report to the user.

Moreover, in the above-mentioned embodiment, the example is described in which the switching transistor Tr1 operates in the active state due to an abnormality in the drive signal. However, the present disclosure can also be applied to a case where the switching transistor Tr1 operates in the active state due to other reasons such as the failure of the switching transistor Tr1 itself and an abnormality in connection between circuit elements.

The present disclosure is suitable for a DC-to-DC converter using a transistor as a switching element of a non-insulation type DC-to-DC converter.

The invention claimed is:

1. A DC-to-DC converter comprising:
   a direct current voltage conversion circuit unit including
   a first switching transistor connected in series to a direct current input power supply to form a closed circuit with the direct current input power supply,
   a first drive circuit configured to output a first drive signal to control the opening and closing of the first switching transistor in a predetermined cycle to a control terminal of the first switching transistor,
   a first capacitor connected between a pair of a high voltage-side connection line and a low voltage-side connection line, the pair being connected to a load,
   a first inductor configured to convert an output voltage between the pair of the high voltage-side connection line and the low voltage-side connection line to a direct current voltage different from an input voltage of the direct current input power supply with the interruption of a current flowing from the direct current input power supply by the opening and closing operation of the first switching transistor, and
   a first constant voltage control circuit configured to control a closed time of the first switching transistor with the first drive signal in accordance with the output voltage between the pair of the high voltage-side connection line and the low voltage-side connection line and perform constant voltage control on the output voltage;
   an abnormality determination circuit including a first comparison circuit to compare a voltage of a connection point on a side, which is connected to the first inductor, of the first switching transistor and a threshold voltage freely set within the range of fluctuation of the voltage of the connection point during the switching operation of the first switching transistor, the abnormality determination circuit being configured to determine that the first switching transistor is operating in an active state upon polarity found by the comparison of the voltage of the connection point and the threshold voltage does not change during a detection period longer than the predetermined cycle of the first drive signal; and
   a protection circuit unit connected between the direct current input power supply and the direct current voltage conversion circuit unit to shift to protection operation mode at the time when the abnormality determination circuit determines that the first switching transistor is operating in the active state and to execute an operation of protecting the direct current voltage conversion circuit unit, wherein
   the protection circuit unit includes
   a second switching transistor connected between the direct current input power supply and the first switching transistor,
   a second drive circuit configured to normally output a second drive signal to perform control of closing the second switching transistor to a control terminal of the second switching transistor, and output the second drive signal to perform control of opening and closing the second switching transistor in a predetermined cycle in the protection operation mode,
   a second capacitor connected between the pair of the high voltage-side connection line and the low voltage-side connection line on an input side of the direct current voltage conversion circuit unit,
   a second inductor configured to in the protection operation mode convert a voltage across the second capacitor to a direct current voltage obtained by stepping down the input voltage of the direct current input power supply with the interruption of the current flowing from the direct current input power supply by the opening and closing operation of the second switching transistor, and
   a second constant voltage control circuit configured to in the protection operation mode control a closed time of the second switching transistor with the second drive signal in accordance with the voltage across the second capacitor and perform constant voltage control on the voltage across the second capacitor.

2. The DC-to-DC converter according to claim 1, wherein the second constant voltage control circuit brings the voltage across the second capacitor to a voltage slightly higher than the output voltage between the pair of the high voltage-side connection line and the low voltage-side connection line, the pair being connected to the load, through constant voltage control so that the amount of heat generation of the first switching transistor due to a voltage across the first switching transistor does not exceed a maximum heat dissipation amount of the first switching transistor.

3. The DC-to-DC converter according to claim 1, further comprising a reporting unit configured to, upon the abnormality determination circuit determining that the first switching transistor is operating in the active state, report the determination result to the outside.

* * * * *